United States Patent [19]

Bainbridge et al.

[11] Patent Number: 4,759,615
[45] Date of Patent: Jul. 26, 1988

[54] ILLUMINATION SYSTEM USING AMPLIFIED POLARIZED LIGHT

[75] Inventors: Richard C. Bainbridge; Kenneth J. Fisher, both of Erie, Pa.

[73] Assignee: American Sterilizer Company, Erie, Pa.

[21] Appl. No.: 872,038

[22] Filed: Jun. 9, 1986

[51] Int. Cl.$^4$ .................. G02B 27/28; F21L 15/08
[52] U.S. Cl. .................... 350/399; 128/380; 250/213 R; 362/103
[58] Field of Search .............. 350/370, 372, 399; 250/213 R; 128/380; 362/103

[56] References Cited

U.S. PATENT DOCUMENTS 2,214,802  9/1940  Tillyer .................... 350/399
4,234,910  11/1980 Price ..................... 350/96.1
4,481,531  11/1984 Waude et al. ............ 250/213 R

OTHER PUBLICATIONS

Lumsden, *Effective Task Lighting Using Polarized Light*, Light and Lighting, Jul./Aug., 1976.
*Comparison Report on Polarized Panels V. Conventional Prismatic Lenses*, published by the Polarized Corp. of America.
*Visual Benefits of Polarized Light*, by H. R. Blackwell.

Primary Examiner—Bruce Y. Arnold
Attorney, Agent, or Firm—Kirkpatrick & Lockhart

[57] ABSTRACT

An illumination system is comprised of a source of polarized light for illuminating a subject. A light amplifier having an input and an output is provided. A filter is positioned at the input of the amplifier for admitting into the amplifier light of the proper polarization reflected by the subject such that the admitted polarized light is amplified to produce a glare-free, visually enhanced image of the subject.

3 Claims, 1 Drawing Sheet

ILLUMINATION SYSTEM USING AMPLIFIED POLARIZED LIGHT

BACKGROUND OF THE INVENTION

FIELD OF THE INVENTION

The present invention is related generally to illumination systems and more particularly to illumination systems utilizing polarized light.

The benefits of using polarized light for illumination in offices, stores, manufacturing facilities, and the like have been recognized. See, for example, Lumsden, *Effective Task Lighting Using Polarized Light*, LIGHT AND LIGHTING, July/August, 1976; and *Comparison Report on Polarized Panels v. Conventional Prismatic Lenses*, published by the Polarized Corporation of America of 8921 Quartz Avenue, Northridge, Calif.

The polarized light used for interior lighting reacts differently in response to the orientation of the illuminated surface. For example, vertically plane-polarized light tends to be absorbed and re-emitted from horizontal surfaces but reflected from vertical surfaces in the form of a light-veil commonly referred to as glare. In an office or manufacturing setting, it may be possible to minimize the number of vertical surfaces such that the amount of overall glare is substantially reduced. However, in a surgical setting, even assuming that the number of vertical surfaces may be reduced, some small number of vertical surfaces will still be present which will result in the production of glare which may periodically obscure the surgeon's vision. Such a situation is totally unacceptable in a surgical setting.

It has been suggested to eliminate the amount of glare produced by various surfaces or wet tissue in a surgical incision by inserting a polarized filter between the surgeon and the patient. This second polarized filter would function much the same as sunglasses do in eliminating glare. Unfortunately, polarizing filters typically have transmission factors which may vary from 22% to 55%. Thus, positioning a polarizing filter in front of the light source and positioning a complimentary polarizing filter between the surgeon and the patient drastically reduces the amount of light which reaches the surgeon's eyes. Any visual enhancement gained by the polarization is lost due to the insufficient illumination.

Attempts to overcome these optical losses by pumping more energy into the light source have proved unsuccessful. The heat generated by the increased power has proved unacceptable in a surgical setting. Additionally, the costs involved in providing a light source capable of handling such high power have proved prohibitive. Thus, polarized light has not heretofore been used in surgical settings or other settings involving these types of problems.

SUMMARY OF THE PRESENT INVENTION

The present invention is directed to an illumination system for providing visual enhancement by amplifying polarized light. The system is comprised of a source of polarized light for illuminating a subject. A light amplifier having an input and an output is provided. A filter is positioned at the input of the amplifier for admitting into the amplifier light of the proper polarization reflected by the subject such that the admitted polarized light is amplified thereby producing a glare-free visually enhanced image.

According to one embodiment of the present invention, the source of polarized light, the light amplifier, and the filter are carried in a predetermined relationship by a head-worn apparatus.

According to another aspect of the present invention a first optical fiber is provided for conducting the polarized light eminating from the source to the subject to be illuminated. A second optical fiber is provided for conducting the light reflected by the subject to the filter. This embodiment of the invention can be used for endoscopic or arthroscopic applications.

The present invention is also directed to a method of visual enhancement using amplified polarized light. The method is comprised of the steps of illuminating a subject with polarized light. At least a portion of the polarized light is reflected off the subject. The reflected polarized light is filtered using a polarizing filter such that only light of the proper polarization is transmitted through the polarizing filter. The transmitted light is then amplified.

The illumination system of the present invention overcomes the problems of the prior art in that glare is eliminated without having to increase the power consumption or cost of the source of illumination. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompaning figures wherein.

DESCRIPTION OF A PREFERRED EMBODIMENT

Figure 1:
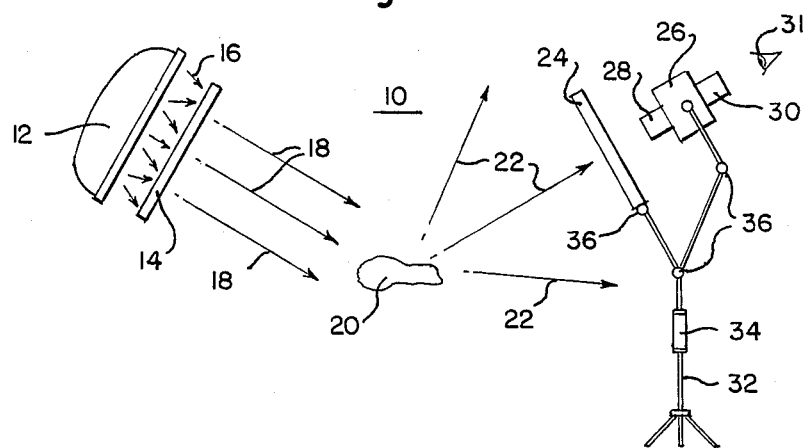
FIG. 1 illustrates an illumination system constructed according to the teachings of the present invention and used as the primary lighting in a surgical environment.

In FIG. 1 an illumination system 10 constructed according to the teachings of the present invention and used as the primary lighting in a surgical environment is shown. Although the present invention is described in conjunction with a surgical environment, it should be apparent that the present invention is equally applicable to other environments wherein similar lighting problems are faced.

The lighting system 10 illustrated in FIG. 1 is comprised of a known surgical light 12. A linear plane polarizing filter 14 is provided for polarizing the light 16 eminating from the surgical light 12. The polarized light 18 is used to illuminate a subject 20.

The subject 20 reflects a portion of the polarized light 18 as indicated by the reflected light rays 22. If the polarized light 18 is vertically polarized, for example, horizontal surfaces of the subject 20 will absorb and re-emit certain of the light rays 18 such that glare is not produced. However, certain surfaces of the subject 20, especially vertical surfaces, may reflect the polarized light rays 18 such that glare is produced. In order to eliminate this glare, a second linear plane polarizing filter 24 is provided. The second filter 24 is complimentary to the first filter 14. That is, if the filter 14 is a vertically polarizing filter, then the filter 24 should be a vertically polarizing filter.

The illumination system 10 illustrated in FIG. 1 also includes a micro-channel plate image intensifier 26 (hereinafter "MCP" image intensifier 26). The MCP image intensifier 26 may be a commercially available unit available from Varo, Inc., Electron Devices Division, located at 2203 West Walnut Street, P.O. Box 469014, Garland, Tex. Any type of light amplification unit, however, can be used to provide the function of MCP image intensifier 26. The MCP image intensifier 26 has an input end 28 and an output end 30.

The second polarizing filter is positioned at the input end 28 of the MCP image intensifier 26. Because the second polarizing filter 24 is complimentary to the first polarizing filter 14, the second polarizing filter 24 admits into the input end 28 of the MCP image intensifier 26 only light of the proper polarization which is reflected by the subject 20. The reflected illumination 22 that is transmitted by the second polarizing filter 24 is amplified by the MCP image intensifier 26 such that a glare-free visually enhanced image is available at the output end 30 of the MCP image intensifier 26 for viewing by an observer 31 or recording by a video camera (not shown). This visually enhanced output image is produced without having to increase the power delivered to light source 12 even though substantial amounts of illumination may be lost by virtue of the first and second polarizing filters 14 and 24, respectively.

The second polarizing filter 24 and the MCP image intensifier 26 may be carried by a stand 32. The stand 32 may be of a type which is adjustable as indicated by the reference numeral 34 and which has various articulation points 36 that permit movement including the rotatation of filter 24 to allow for variations in the degree of polarization. Thus, although the orientation of the second polarizing filter 24 and the MCP image intensifier 26 may be changed, a fixed relationship nonetheless exists between these two components. Additionally, it is possible to establish a fixed relationship between the first polarizing filter 14 and the stand 32 carrying the second polarizing filter 24 such that maximum light transfer is achieved. In this manner, the present invention overcomes the problems of the prior art in a cost effective manner.

Figure 2:
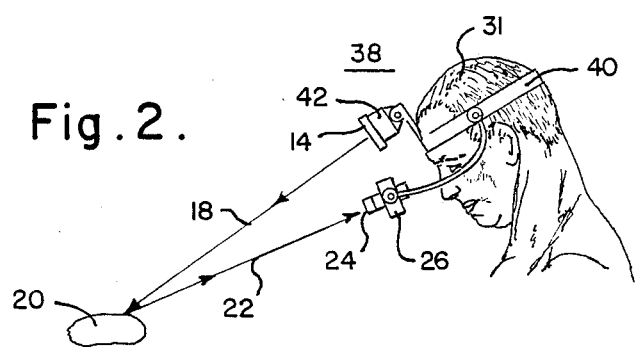
FIG. 2 illustrates an illumination system constructed according to the teachings of the present invention and carried by a head-worn apparatus.

Turning now to FIG. 2, an illumination system 38 constructed according to the teaching of the present invention and carried by a head-worn apparatus 40 is illustrated. In FIG. 2, like components are designated by the same reference numeral as used in FIG. 1.

In FIG. 2, the source of light is a headlamp 42. The light produced by the headlamp 42 is polarized by the first polarizing filter 14 to produce polarized light 18. The polarized light 18 illuminates the subject 20 which reflects at least a portion 22 of the polarized light 18. The reflected light 22 is input to the MCP image intensifier 26 through the second complimentary polarizing filter 24. In this manner the user receives a glare-free enhanced visual image.

The headlamp 42 and MCP image intensifier 26 are carried by the head-worn apparatus 40 as shown in FIG. 2. The headlamp 42 and MCP image intensifier 26 may be connected to the head-worn apparatus 40 in such a manner so as to be adjustable with respect thereto. Nevertheless, the head-worn apparatus 40 maintains a fixed, although adjustable, relationship between the headlamp 42 and the MCP image intensifier 26. In this manner, maximum light transmission is achieved.

Figure 3:
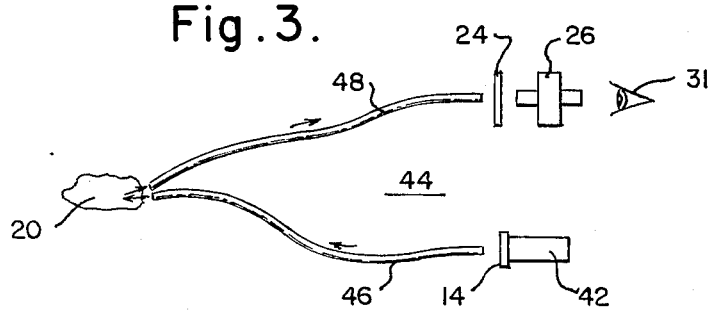
FIG. 3 illustrates an illumination system constructed according to the teachings of the present invention useful in endoscopic and arthroscopic applications.

An illumination system 44 constructed according to the teachings of the present invention and useful in endoscopic and arthroscopic applications is illustrated in FIG. 3. Again, like components have like reference numerals.

In FIG. 3, the light produced by the headlamp 42 and polarized by the first polarizing filter 14 is conducted to the object 20 to be illuminated through a first optical fiber 46. A portion of the light reflected by the object 20 is conducted through a second optical fiber 48 to the second polarizing filter 24 which transmits only light of the proper polarization to the MCP image intensifier 26. The MCP image intensifier 26 amplifies the transmitted light thereby providing an enhanced, glare-free image of the subject 20. The headlamp 42, first and second optical fibers 46 and 48, respectivly, first and second polarizing filters 14 and 24, respectively, and the MCP image intensifier 26 may all be carried by a head-worn apparatus of the type illustrated in FIG. 2.

The present invention is also directed to a method of visual enhancement using amplified polarized light. As can be seen from FIG. 1, the method is comprised of the steps of illuminating a subject 20 with polarized light 18. At least a portion 22 of the polarized light 18 is reflected by the subject. The reflected polarized light 22 is filtered with a polarizing filter 24 such that only light of the proper polarization is transmitted through the polarizing filter 24 to the MCP image intensifier 26. The MCP image intensifier 26 amplifies the received light thereby providing an enhanced, glare-free image of the subject 20. This is accomplished without adding additional power to the light 12 even though the first and second polarizing filters 14 and 24, respectively, may substantially reduce the amount of transmitted light.

While the present invention has been described in connection with exemplary embodiments thereof, it will be understood that many modifications and variations will be readily apparent to those of ordinary skill in the art. This disclosure and the following claims are intended to cover those modifications and variations.

What is claimed is:

1. A head-worn apparatus for providing visual enhancement by amplifying polarized light, said apparatus comprising:
   a source of polarized light for illuminating a subject;
   means for amplifying light, said means having an input and an output; and
   filter means positioned at said input of said amplifying means for admitting into said amplifying means light of the proper polarization reflected by the subject such that said admitted polarized light is amplified thereby producing a glare-free visually enhanced image available at said output of said amplifying means, said means for amplifying and said filter means being carried by the head-worn apparatus in a fixed relationship with respect to said source of polarized light.

2. The system of claim 1 wherein said source of polarized light includes a light and a second filter means for polarizing said light emanating from said light.

3. The system of claim 2 wherein said second filter means includes a linear polarizer and said filter means includes a complimentary linear polarizer.

* * * * *